Sept. 2, 1952 F. H. HELSLEY 2,608,926
WIND DEFLECTOR FOR AUTOMOBILE REAR SEATS
Filed April 2, 1948
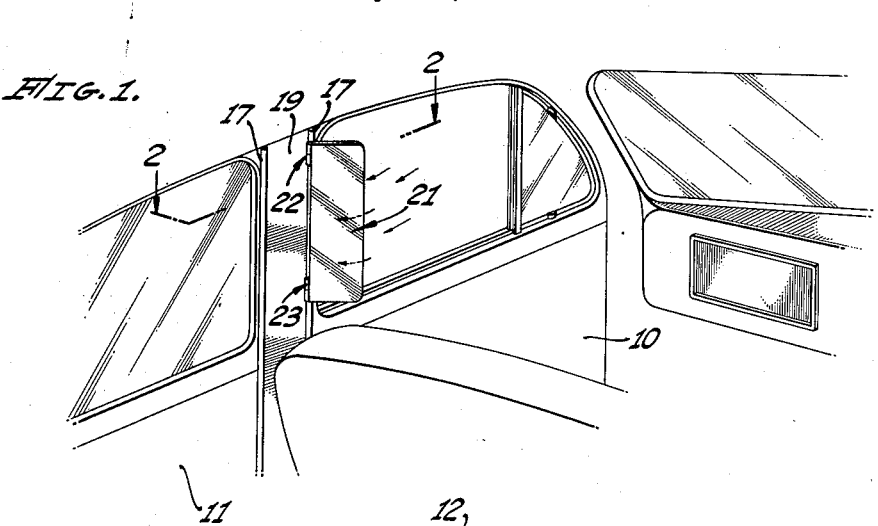
FIG. 1.
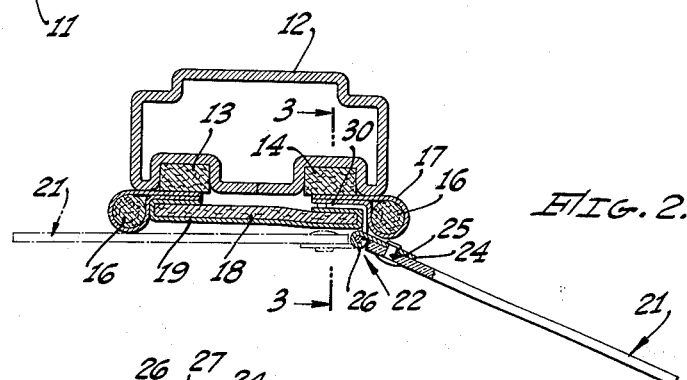
FIG. 2.
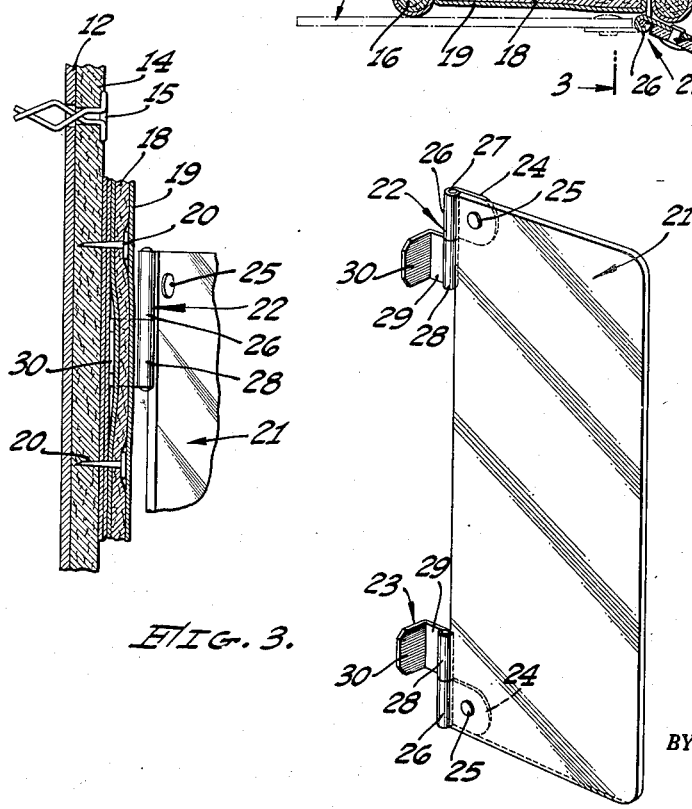
FIG. 3.
FIG. 4.
INVENTOR.
FRANK H. HELSLEY.
BY Hazard & Miller
ATTORNEYS.

Patented Sept. 2, 1952

2,608,926

UNITED STATES PATENT OFFICE 2,608,926

WIND DEFLECTOR FOR AUTOMOBILE REAR SEATS

Frank H. Helsley, Los Angeles, Calif.

Application April 2, 1948, Serial No. 18,515

5 Claims. (Cl. 98—2)

This invention relates to a wind deflector for use on automobiles.

In the usual driving of automobiles of the sedan type the window in the front door adjacent the driver's seat is usually left open not only for ventilation purposes but to facilitate the giving of arm signals. When this window is left open drafts may enter therethrough that are objectionable to rear seat passengers. An object of the present invention is to provide a wind deflector that will deflect such drafts outwardly, thus avoiding the objection made thereby to rear seat passengers.

More specifically, an object of the invention is to provide a wind deflector that can be easily applied to or between the upholstered facing elements that are conventionally present on the interior of the door jamb for the front and rear doors of sedan type automobiles without marring or requiring the alteration of such elements.

Another object of the invention is to provide a wind deflector of this character which can be easily, quickly and economically manufactured and readily installed and which is adjustable to any desired position to prevent the objectionable incoming drafts.

With the foregoing and other objects in view, which will be made manifest in the following detailed description and specifically pointed out in the appended claims, reference is had to the accompanying drawings for an illustrative embodiment of the invention, wherein:

Figure 1 is a partial view in perspective of the interior of a sedan type automobile illustrating the deflector embodying the present invention as having been installed therein;

Fig. 2 is a horizontal section taken substantially upon the line 2—2 upon Fig. 1;

Fig. 3 is a vertical section taken substantially upon the line 3—3 upon Fig. 2 in the direction indicated; and Fig. 4 is a perspective view of the deflector.

Referring to the accompanying drawings wherein similar reference characters designate similar parts throughout, 10 indicates the left front door of a sedan type automobile, the window of which during ordinary weather is left open for ventilation and arm signaling purposes. 11 indicates the rear door on the same side of the automobile. These doors in the conventional construction are closable against a door jamb 12 disposed therebetween. In the usual construction of this door jamb wooden or fiber elements 13 and 14 are recessed in the inner side of the door jamb and are retained in position therein in any suitable manner such as by fastening elements 15. The interior of the door jamb is usually upholstered by means of rolls in the form of cords 16 which are covered over or enclosed within fabrics 17. The edges of the enclosing fabrics extend inwardly so as to be positioned against the inner faces of the strips 13 and 14, respectively. A facing element 18 is usually covered by fabric 19 and bridges the space between the rolls at the sides of the door jamb. Tacks are similar fastening elements, indicated at 20, are positioned with their heads between the facing element 18 and the inturned edges of the covering fabric 19 and are driven into the strips 13 and 14. In this manner the heads of the fastening elements are effectively concealed. These fastening elements in the conventional automobile of the sedan type are suitably spaced apart, the spacing frequently being in the neighborhood of from 1½" to 2" although the exact spacing is immaterial in so far as the present invention is concerned.

The wind deflector embodying the present invention consists of a suitable section 21 of transparent material, preferably a transparent, synthetic resin plastic such as, for example, Lucite. This section has friction hinges secured thereto adjacent its top and bottom, such hinges being generally indicated at 22 and 23. Each hinge consists of one leaf 24 that is secured to the transparent section 21 such as by a rivet 25. This section has integral therewith a knuckle 26 that receives one end of a hinge pin 27. The other leaf of each hinge consists of a knuckle 28 through which the hinge pin 27 extends and an angular leaf portion. The portion 29 of the leaf which is most adjacent the hinge pin is approximately equal in length to the diameter of the roll 16 and the laterally bent portion 30 extends laterally only a relatively short distance such as, for example ½" to ¾". The height of the leaf is less than the spacing between the fastening elements 20.

With the wind deflector as thus constructed it is possible to insert the laterally extending portion 30 of each hinge between the roll 16 and the edge of the facing element 18 and position the two free or unattached leaves of the hinges between the facing element 18 and the inwardly extending edges of the fabric 17. In the usual situation the facing element 18 is held sufficiently snugly against the strips 13 and 14 so as to frictionally hold the lateral portions 30 on the leaves in the position in which they are inserted. However if, due to vibration or any looseness existing, the wind deflector should possibly slide down, it can only do so to the extent of the next subjacent fastening element 20 that is encountered.

The two knuckles 26 and 28 are sufficiently tight so as to frictionally grip on the hinge pin 27 and while the deflector may be forcibly swung on the hinge pins as is indicated by a comparison of the full line position shown in Fig. 2 with the dotted line position shown therein, the deflector will normally remain in any adjusted position by reason of the frictional engagement of the knuckles 26 with the hinge pin. In this manner the deflector can be adjusted to any desired position to deflect wind entering through the open window in the front door. If not desired it can be swung into the position shown in dotted lines on Fig. 2 without involving its removal from the door jamb.

From the above described construction it will be appreciated that an improved wind deflector is provided which is applicable to the door jambs of sedan type automobiles. It may be easily and quickly installed by merely inserting the angular leaf of each hinge between the roll and the facing element on the door jamb. This does not involve a marring or any alteration of the upholstery within the automobile so that if at any time it is desired to remove the wind deflector entirely the upholstery will retain its initial condition and appearance.

Various changes may be made in the details of construction without departing from the spirit and scope of the invention as defined by the appended claims.

I claim:

1. In combination with a vehicle body having a door jamb, and rolls extending vertically along the inside edges of the jamb and a facing between the rolls, a wind deflector, and means secured to the deflector inserted between a roll and the facing and extending behind the facing for mounting the deflector on the door jamb.

2. In combination with a vehicle body having a door jamb, and rolls extending vertically along the inside edges of the jamb and a facing between the rolls, a wind deflector, hinges secured to the deflector adjacent the top and bottom thereof, each hinge having an angular leaf which is angular in horizontal cross section inserted between a roll and the facing and which extends behind the facing for mounting the deflector on the door jamb.

3. A wind deflector for a sedan-type automobile having a roll and a facing on the interior of a jamb comprising a section of transparent material having friction hinges secured thereto adjacent the top and bottom thereof, each hinge having a hinge pin and a leaf which is angular in horizontal cross section providing a portion adjacent the hinge pin and a portion remote therefrom adapted to be inserted between the roll and the facing element on the interior of the jamb of a sedan-type automobile, that portion most adjacent the hinge pin being approximately equal in length to the diameter of the roll.

4. A wind deflector for a sedan-type automobile having a roll and a facing on the interior of a jamb comprising a section of transparent material having hinges secured thereto, one leaf of each hinge being angular in horizontal cross section so as to be insertable behind the facing element on the interior of the door jamb of a sedan-type automobile with the portion of each leaf most adjacent the hinge pin occupying a position adjacent the roll and the other portion of each leaf occupying a position behind the facing element.

5. In a vehicle body having a door jamb and rolls extending vertically along inside edges of the jamb and a facing between the rolls, a wind deflector having hinges secured thereto, said hinges having leaves which are angular in horizontal cross section inserted between a roll and the facing and extending laterally behind the facing thus mounting the deflector on the door jamb.

FRANK H. HELSLEY.

REFERENCES CITED

The following references are of record in the file of this patent:

UNITED STATES PATENTS

| Number | Name | Date |
|--------|------|------|
| 805,483 | Nefflen | Nov. 28, 1905 |
| 1,849,176 | De Fries | Mar. 15, 1932 |
| 1,968,948 | Lang | Aug. 7, 1934 |

FOREIGN PATENTS

| Number | Country | Date |
|--------|---------|------|
| 694,957 | France | May 3, 1930 |